A. O. HOLTOM.
VEHICLE BODY.
APPLICATION FILED SEPT. 10, 1917.
1,327,558.
Patented Jan. 6, 1920.
3 SHEETS—SHEET 1.
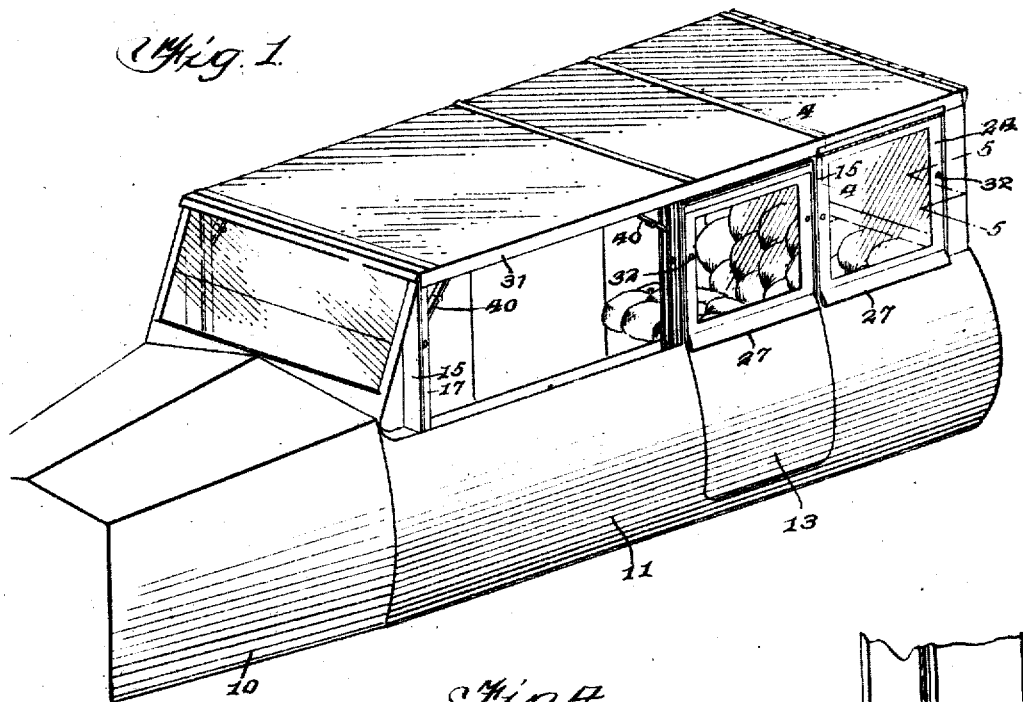
Inventor
Albert O. Holtom.
By his Attorneys
Mason, Fenwick & Lawrence

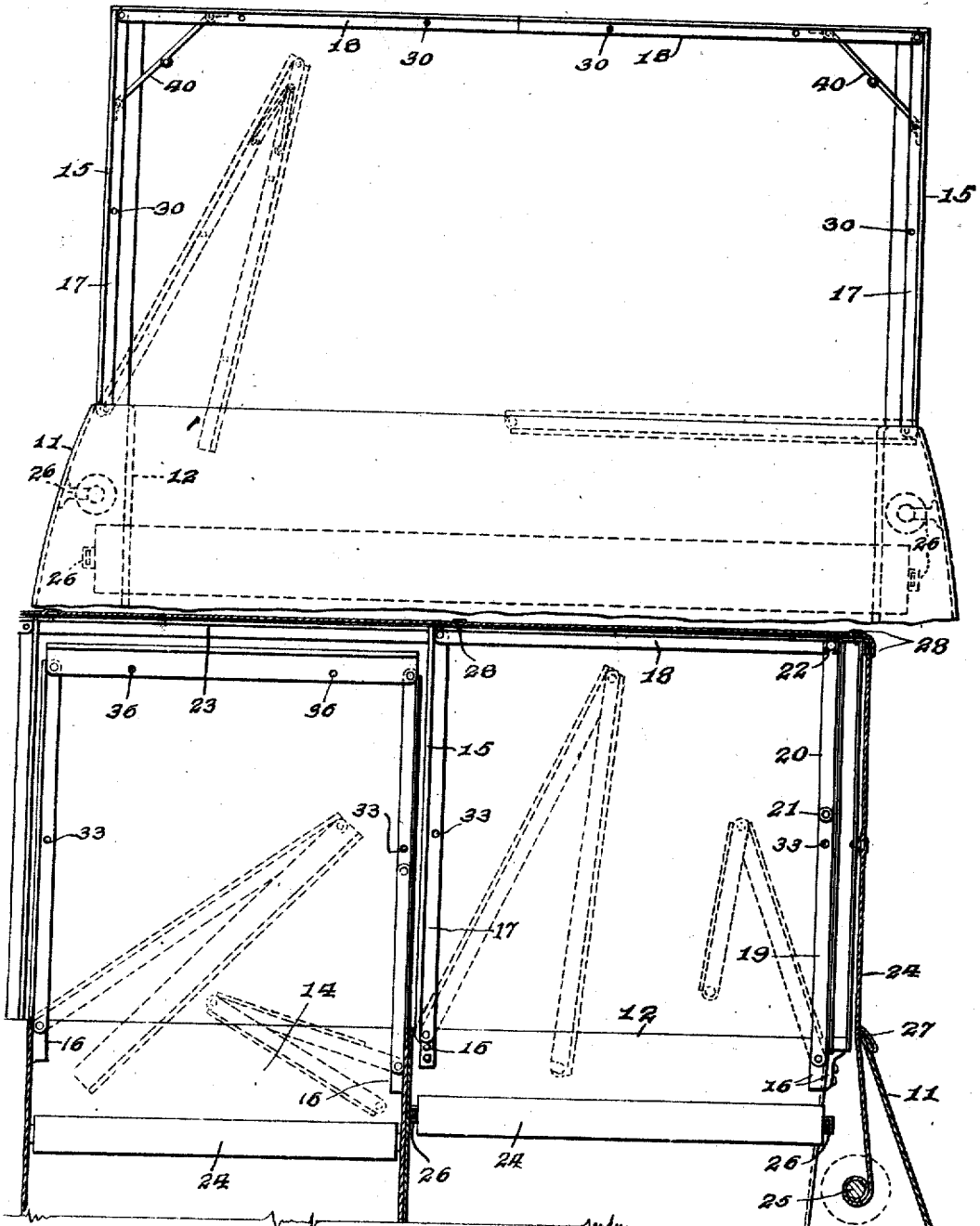

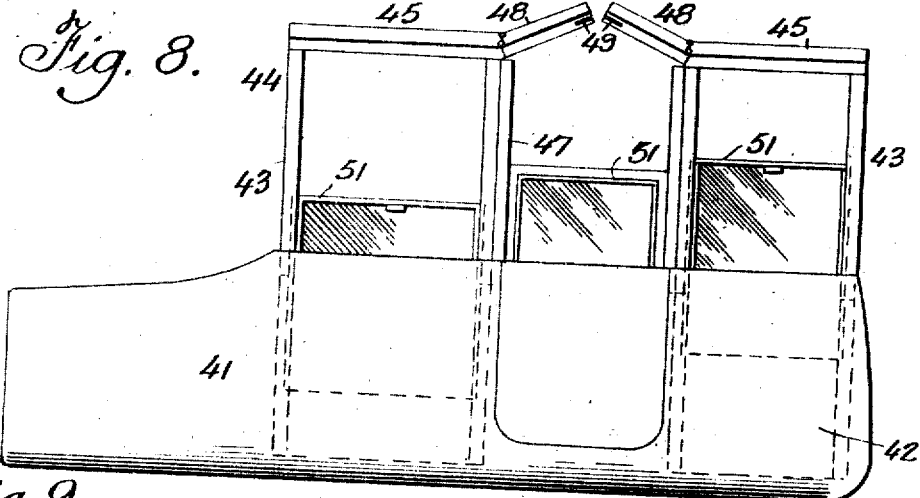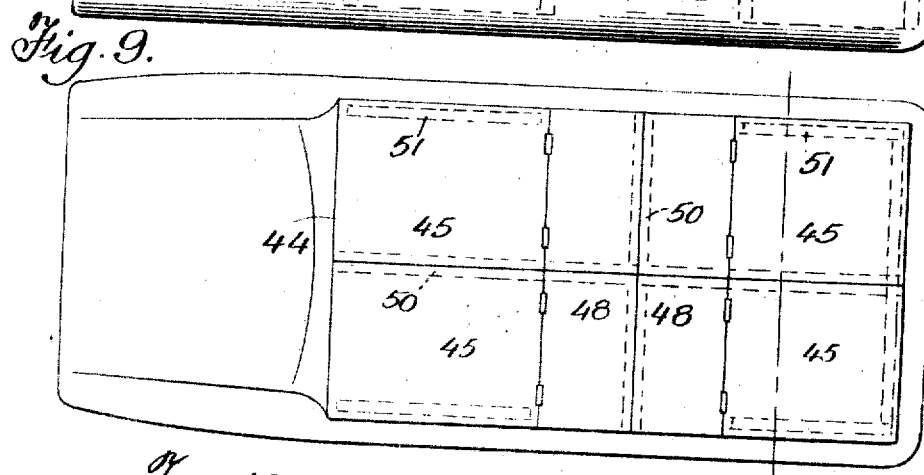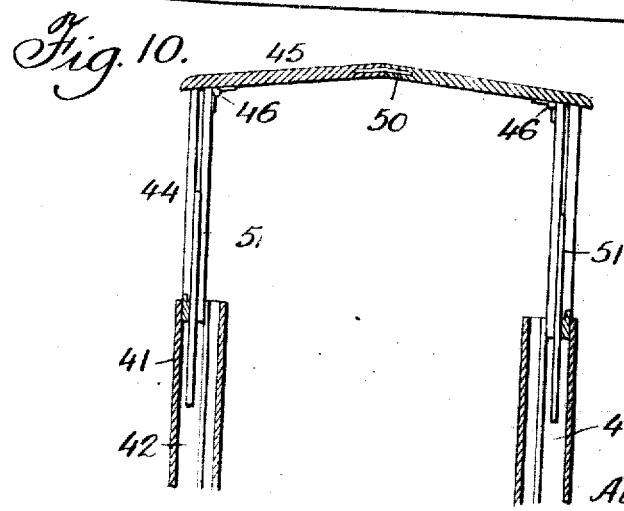

UNITED STATES PATENT OFFICE.

ALBERT OWEN HOLTOM, OF NEW YORK, N. Y.

VEHICLE-BODY.

1,327,558. Specification of Letters Patent. Patented Jan. 6, 1920.

Application filed September 10, 1917. Serial No. 190,592.

*To all whom it may concern:*

Be it known that I, ALBERT O. HOLTOM, a subject of the King of England, residing at New York city, in the county of New York and State of New York, have invented certain new and useful Improvements in Vehicle-Bodies; and I do hereby declare the following to be a full, clear, and exact description of the invention, such as will enable others skilled in the art to which it appertains to make and use the same.

This invention relates to automobile bodies and more particularly to that type where the elements of construction permit either an inclosed or open type of body.

It has for an object to provide a vehicle body having a double wall to form a pocket in which curtains or closures for use in the formation of the closed body may be concealed when it is desired to convert the body into an open type of body.

A further object of this invention is the provision of a construction for vehicle bodies in which the usual top rail about the side of the body serves as a support in forming a superstructure over which the top may be placed, when the sections of the top rail are swung to extended position.

A further object of this invention is the provision of a vehicle body having portions thereof movable to form a superstructure, and having a flexible covering extensibly carried in said body to be drawn over the superstructure and attached thereto.

A further object of this invention is the provision of a superstructure formed partially of sections of the top rail about the walls of said body, flexible curtains extensibly carried in the side walls of the body, and means for rendering a water tight joint when said curtains are in their extended position.

Further objects will be apparent from the following specification, appended claims and drawings, in which—

Figure 1 is a perspective view of a vehicle body made in accordance with this invention, Fig. 2 is a rear view of a portion of the body showing the superstructure formed thereon, Fig. 3 is a vertical sectional view of a portion of the side wall showing the superstructure, Fig. 4 is a composite section and elevation in perspective view as on the line 4—4 of Fig. 1, Fig. 5 is a horizontal sectional view as on the line 5—5 of Fig. 1, Fig. 6 is a vertical cross-sectional view through a portion of the side wall showing the superstructure folded, Fig. 7 is a sectional view showing a modification of the form of superstructure, Fig. 8 is a side elevation showing a slightly modified type of convertible body, Fig. 9 is a plan view thereof, and Fig. 10 is a cross-sectional view as on line 10—10 of Fig. 9.

Referring to the drawings in which the several features are clearly shown, 10 indicates a body having the side walls formed of the outer shells 11 and inner shells 12, and having doors hinged in the side walls in the usual manner. These doors comprise the outer shells 13, and the inner shells 14. A top rail comprising the section 15 is secured to the body to have these sections overlie the openings formed by the double walls and these sections are hingedly secured to the body as by the brackets 16. These sections may be formed of wood or sheet metal in channel form, and in either of the constructions, recesses 17 are formed.

By mounting the sections 15 on the brackets 16, they may be swung to vertical position at which time, extensions 18 which are hingedly carried by the sections 15 may be swung to form a top rail of the superstructure. Where the openings formed by the superstructure are of less length than approximately twice the length of the sections 15, it is necessary to provide a supplemental support for the free end of the extension 18, so I provide a support formed of two sections 19 and 20 hinged to each other as at 21, which may be swung from between the side walls to vertical position where it may be attached as at 22 to the free end of the extension. The lower end of one of the members may be supported by a bracket 16 in similar manner to the sections 15. To provide a span over the door-way, a leaf 23 may be hingedly carried by one of the extensions 18 in either side of the doorway.

When the superstructure is formed by raising the sections 15, swinging the extensions 18 to form the top rails of the superstructure and extending the supplemental supports for the free ends of these extensions, curtains 24 may be drawn from the pocket formed by the double walls of the body and secured to the superstructure. These curtains are mounted upon rollers 25 carried by the brackets 26 and when these curtains have been drawn to the desired degree, a tuck 27 formed across the curtain is so positioned as to overlie the outer shell 11 so that water running down the curtain is directed to the outer face of the outer shell. The rear and top curtain is provided at intervals with the cross bars 28 which connect the opposite sides of the superstructure, and these bars have fasteners 29 formed thereon which enter holes 30 in the members of the superstructure. This curtain also has the flap 31 formed thereon which hangs over the sides of the top rail of the superstructure.

The side curtains have fasteners 32 secured therein which enter holes 33 in the uprights of the superstructure. The edge of the curtain has a reinforcing strip 34 secured thereto which is formed by bending the length of metal upon itself to grip the opposite side of the curtain. Fasteners 35 are carried by this strip and these fasteners enter holes 36 in the top rails of the superstructure. It is evident that when these strips are secured to the top rail, they reinforce the top rail along the joints. These strips also have leaves 37 hingedly secured thereto which are spring pressed to securely grip the flap 31 of the cover when these side curtains are extended and secured in position.

In Fig. 7, 38 is carried by links 39 which permit this top rail serving in its capacity in both the compact and extended forms. It is also possible to support the top rail by having pins carried by links operate in slots formed in the under face of this top rail.

It is evident that in proportioning the length of the uprights 15, due consideration must be given to the dimensions of the opening to be formed by the superstructure, and the dimensions must be so proportioned as to accommodate four panel sections and the door sections. It is also possible to support the extensions 18 as by the folding braces 40 to temporarily hold these extensions until the cross bar 28 of the cover are secured in place. In forming the upright with the recessed portion 17, clearance is provided to permit curtains 24 being drawn through the opening formed between the upper edges of the two shells. That is, it allows a curtain of the maximum width being used to permit the curtains being secured to the upright. The fasteners 29 and 35 are not intended to show any particular type, but are conventional inasmuch as any similar type of fastener may be substituted therefor. The curtains will preferably be provided with transparent inserts and the rear curtains may also have a similar insert if desired.

By securing the front end of the top curtain to the wind shield and by providing the reinforcing cross strips 28 together with the other reinforcing strips formed on the side curtains, it is evident that a solid superstructure is formed when all of the parts are properly positioned. When the top curtain is secured in place, it securely ties the several sections of the superstructure so that damage from wind cannot occur when the side curtains are concealed.

In Figs. 8, 9 and 10, there is shown a body 41 having double side walls to form a pocket as described above. Guides 42 are secured between the side walls, and these guides slidably support the stiles 43 of the frames 44. These frames may be raised to form a superstructure, by which, the roof is sustained, and the roof is preferably formed of sections 45 hingedly carried by the frames 44 as at 46, which sections fold against the frames and slide into the pockets in the side walls when the cover is to be concealed. The doors in the body have independently slidable frames 47 mounted therein in guides similar to those shown at 42.

To provide roof sections overlying the space between the doors, sections 48 are hingedly carried by the sections 45, and these sections 48 may be swung to form a continuous roof. The sections 48 will be folded over the supporting sections 45 before the sections 45 are folded against the frames 44, when the superstructure is to be concealed.

The meeting edges of the section 45 and 48 may have the longitudinal slots 49 formed therein to receive the fillets 50, which may be slid in place when the superstructure is set up. This produces a water tight joint and also assists in reinforcing these meeting edges.

The frames 44 and 47 will have sash guides 51, so that these sashes may be raised to form a completely inclosed body, and the rear double wall will also have an extensible frame to support a rear sash.

It is evident that by removing sills from the double side walls of the body, access may be had to the pocket, and then the extensible frames may be raised and locked in any desired manner. Then the roof sections may be swung in place to receive the fillets and a rigid superstructure and cover formed. The side closures may be positioned to completely close the body or they may be slid into the pockets in the side walls in fair weather.

Various other modifications may be made in view of the foregoing without departing from the spirit of this invention and no limitation is implied by the limited showing of the drawings herewith.

Having thus described this invention,

I claim:

1. A convertible vehicle body comprising doubled side walls having pockets formed therein, sills hingedly mounted at their ends to said side walls to form covers over said pockets in certain positions thereof and to be swung upright in other positions thereof, top rails hingedly carried by said sill sections extensible to form a superstructure, curtains carried by said side walls in the pockets thereof and fasteners carried by said extensible curtains having engagement with said top rails to reinforce and lock said top rails in fixed position.

2. A convertible vehicle body comprising doubled side walls having pockets formed therein, sills hingedly mounted in said side walls, said sills being formed in sections, said sills forming covers for said pockets in certain positions thereof, top rails hingedly carried by said sill sections, extensible to form a superstructure, curtains extensibly carried in said wall pockets, cross-bars at the ends of said curtains, and fasteners carried by said cross-bars for engagement with said top rails to reinforce said top rails and lock the separable parts together.

3. A convertible vehicle body comprising doubled side walls forming pockets therein, sills about said side walls being hingedly mounted at the ends of said pockets, top rails hingedly carried by said sill sections, being extensible to form a superstructure, curtains extensibly carried in said pockets in said doubled walls, cross-bars at the free ends of said curtains, said cross-bars including clamping plates and fasteners for engagement with said top rails to reinforce and lock said top rails, and a rear curtain extensible over said superstructure having side flaps formed along the edges thereof to be gripped by the clamping plate of said cross-bars on said extensible curtains.

4. A convertible vehicle body comprising a collapsible superstructure, curtains extensibly carried by said vehicle body, crossbars at the ends of said curtains, clamping plates carried by said cross-bars and fasteners carried by said cross-bars for engagement with said superstructure to reinforce and lock parts thereof together, and an extensible rear curtain to overlie said superstructure and side flaps formed along the edges of said rear curtain to fold over the upper edges of the superstructure and be gripped by the clamping plate on the crossbars of the extensible curtain.

In testimony whereof I affix my signature in presence of two witnesses.

ALBERT OWEN HOLTOM.

Witnesses:
S. C. HAGGERTY,
E. A. MURPHY.